United States Patent [19]

Johnson

[11] 4,033,377
[45] July 5, 1977

[54] CONTROLLER FOR FLUID PRESSURE OPERATED DEVICES

[75] Inventor: Oliver Wendell Johnson, Chaska, Minn.

[73] Assignee: Eaton Corporation, Cleveland, Ohio

[22] Filed: Apr. 23, 1976

[21] Appl. No.: 679,607

Related U.S. Application Data

[63] Continuation of Ser. No. 507,015, Sept. 18, 1974, abandoned.

[52] U.S. Cl. .................. 137/596; 60/384; 91/467; 180/132; 137/625.24; 418/61 B
[51] Int. Cl.² .................................. B62D 5/08
[58] Field of Search ............ 60/384, 386, 402; 91/375 R, 467; 137/596, 625.24; 180/132; 418/61 B

[56] References Cited
UNITED STATES PATENTS

| | | | |
|---|---|---|---|
| 3,348,493 | 10/1967 | Easton | 418/61 B |
| 3,819,307 | 6/1974 | Uppal | 418/61 B |

*Primary Examiner*—Alan Cohan
*Assistant Examiner*—Gerald A. Michalsky
*Attorney, Agent, or Firm*—Teagno & Toddy

[57] ABSTRACT

A controller for fluid pressure operated devices such as power steering systems. The controller is of the type having a primary, rotatable valve member and a follow-up valve member, the valve members defining a neutral position. The follow-up valve member is coupled to the primary valve member for limited movement relative to the neutral position. The controller further comprises a fluid meter including a metering member for measuring the volume of fluid passing therethrough, the metering member being coupled to the follow-up valve member. The controller has an inlet port and first and second control fluid ports which may be connected to the opposite ends of the power steering cylinder. The primary and follow-up valve members cooperate with the housing to define a first plurality of fluid passages providing fluid communication between the inlet port and the first control fluid port through the fluid meter when the valve members are relatively displaced in one direction from the neutral position and providing fluid communicating between the inlet port and the second control fluid port through the meter when the valve members are relatively displaced in the other direction from the neutral position. The first and second pluralities of fluid passages provide substantially the same length of fluid flow path between the inlet port and the corresponding control fluid ports in either direction of displacement of the valve member from the neutral position to provide uniform response in either direction. Preferably, the first and second pluralities of fluid passages are arranged in substantially a mirror image of each other with respect to an imaginary plane perpendicular to the axes of rotation of the valve members, to minimize steering wheel precession. In addition, the valve members maintain axial separation of the fluid flowing to a control fluid port and the fluid returning from a control fluid port to minimize internal leakage.

18 Claims, 8 Drawing Figures

CONTROLLER FOR FLUID PRESSURE OPERATED DEVICES

This is a continuation, of application Ser. No. 507,015, filed Sept. 18, 1974 now abandoned.

BACKGROUND OF THE DISCLOSURE

The present invention relates to a controller for fluid pressure operated devices and, more particularly, to a controller having an improved spool-sleeve valve arrangement.

Although the present invention is equally adapted to any controller for fluid pressure operated devices wherein the controller utilizes a valve spool arrangement, it is especially advantageous when used in controllers for power steering systems of the type employed in off-the-road vehicles, and will be described in connection therewith. More specifically, although the invention will be described in connection with rotatable spool-sleeve valve arrangements, it will be appreciated that the invention may also be utilized with spool valves which operate in response to axial movement.

A controller for a power steering system of the type to which the present invention pertains is described in U.S. Pat. No. Re. 25,126, assigned to the assignee of the present invention. Controllers of the type disclosed in the cited reissue patent have become well known in the art and generally comprise a housing having an inlet and an outlet and a pair of control fluid ports, feeding a power steering cylinder. The vehicle steering wheel is directly connected to the controller and when in the neutral (non-rotating) position, fluid may pass from the inlet through the valve to the outlet (open center system), or fluid from the inlet may be blocked from passing through the valve (closed center system).

When the steering wheel is rotated in one direction from the neutral position, the valve is displaced and fluid flows from the inlet through the valve, to the meter, then to one of the control fluid ports to move the power steering cylinder. When the steering wheel is rotated in the opposite direction, the valve rotates in the opposite direction and fluid flows from the inlet port through the valve, then through the fluid meter in the opposite direction, then to the other of the control fluid ports to move the power steering cylinder in the opposite direction.

Conventionally, controllers of the type described have utilized rotary spool-sleeve valves to direct the flow of fluid from the inlet port in accordance with the rotational position of the steering wheel. In general, rotary spool-sleeve valves comprise a primary valve member (spool) connected directly to the steering wheel and a follow-up valve member (sleeve) surrounding the spool. Axially adjacent the spool and sleeve is a fluid meter, generally a gerotor having an externally toothed member orbiting within an internally toothed member. The externally toothed member is splined to a drive shaft, at the opposite end of which the drive shaft is coupled to the sleeve, such as by a pin pressing therethrough. When the spool is rotated, fluid is permitted to flow to the meter, causing the externally toothed member to orbit and rotate, thus imparting rotary follow-up movement to the sleeve by means of the drive shaft. Generally, the sleeve has a plurality of orifices extending radially therethrough and the spool has a plurality of axially extending grooves on its outer surface to provide communication between certain of the orifices in the sleeve.

One of the problems associated with conventional power steering systems and the controllers used therein is steering wheel "precession", i.e., the position of the steering wheel corresponding to the neutral position of the controller "precesses" or moves slowly in one direction or the other during operation of the system. It is believed that this is caused primarily by imbalance in the fluid flow paths, i.e., the fluid is subjected to a longer path and/or more flow restriction for one direction of steering than for the other. Among the other problems associated with systems and controllers of the type described is internal leakage, primarily between "metered" fluid and "return" fluid. As used herein, the term metered fluid refers to fluid which has been measured by the fluid meter and is then fed to the power steering cylinder. The term return fluid refers simply to fluid displaced by the movement of the power steering cylinder which returns to the valve and passes to the outlet port (or tank port). While the above definitions are strictly true only for a controller in which the flow order is: inlet port - fluid meter - cylinder - outlet port, it will be apparent that the invention is equally adapted for controllers having other flow orders, including but not limited to: inlet port - cylinder - fluid meter - outlet port. In connection with the definitions of metered and return fluids for any particular controller, it should be noted that the remainder of the fluid passing through the spool-sleeve valve is at approximately the same pressure as the metered fluid, but has not been metered and hence, may be referred to as "high pressure, non-metered" fluid.

In many of the conventional spool-sleeve arrangements, the orifices in the sleeve communicating to and from the control fluid ports and the grooves in the spool communicating therewith are arranged in such a manner that grooves containing metered fluid and grooves containing return fluid are in an alternating, interdigitated relationship with each other, thus greatly increasing the length of the interface between metered and return fluid and the opportunity for internal leakage therebetween (see, for example, U.S. Pat. No. 3,819,307).

SUMMARY OF THE INVENTION

Accordingly, it is an object of the present invention to provide a controller for fluid pressure operated devices and a valve spool arrangement therefor which overcome the above-mentioned problems.

It is a more specific object of the present invention to provide a controller for a power steering system which minimizes steering wheel precession through improved design of the valve spool arrangement.

It is an even more specific object of the present invention to provide a valve spool for a controller having a substantially symmetrical fluid flow path in either direction of rotation of the valve.

It is another object of the present invention to provide a valve spool arrangement for use in a control of the class described which reduces internal leakage by reducing the length of the interface between metered and return fluid.

It is a more specific object of the present invention to provide a valve spool arrangement in which the metered and return fluids are maintained axially separated.

It is also an object of the present invention to provide a controller and valve spool arrangement therefor capable of achieving the above-stated objects and also providing an option between open center operation and closed center operation without internal modification of the controller or spool-sleeve valve.

The above and other objects of the present invention, which will become apparent upon a reading of the following detailed description, are accomplished by the provision of an improved controller for fluid pressure operated devices. The controller comprises a housing and valve means disposed therein including a primary, rotatable valve member and a cooperating, relatively rotatable follow-up valve member, the valve members defining a neutral position. The follow-up valve member is coupled to the primary valve member for limited movement relative to the neutral position. The controller includes a fluid meter having a metering member which is coupled to the follow-up valve member for imparting follow-up movement thereto. The controller includes an inlet port, an outlet port and first and second control fluid ports for connection to a device such as a steering cylinder. The primary and follow-up valve members cooperate with the housing to define a first plurality of fluid passages connecting the inlet port in fluid communication with the first control fluid port when the valve members are relatively displaced in one direction from the neutral position and connecting the inlet port in fluid communication with the second control fluid port when the valve members are relatively displaced in the other direction from the neutral position. The first and second pluralities of fluid passages are arranged to provide substantially the same length of fluid flow path between the inlet port and the respective control fluid port in either direction of displacement of the valve members from the neutral position to provide uniform response in either direction, thus minimizing steering wheel precession.

In accordance with another aspect of the present invention, the first and second pluralities of fluid passages defined by the housing in the valve members are arranged in substantially a mirror image of each other with respect to an imaginary plane oriented perpendicular to the axes of rotation of the valve members, thus providing substantially identical fluid flow paths for either direction of operation of the controller.

In accordance with still another aspect of the present invention, the controller housing defines source passage means communicable with the inlet and first and second control fluid passages for connection to the first and second control fluid ports, and first and second fluid meter passages for connection to the fluid meter. The valve means defines first and second pressure passage means adapted to communicate, respectively, between the source passage means and the first fluid meter passage when the valve means is rotatably displaced from the neutral position to a first control position, and between the source passage means and the second fluid meter passage when the valve means is displaced from the neutral position to a second control position. The first and second pressure passage means are oppositely and approximately equally disposed about the imaginary reference plane. The valve means further defines first and second operating passage means adapted to communicate, respectively, between the first fluid meter passage and the first control fluid passage when the valve means is in the second control position and to communicate between the second fluid meter passage and the second control fluid passage when the valve means is in the first control position. The first and second operating passage means are oppositely and approximately equally disposed about the reference plane.

DESCRIPTION OF THE PREFERRED EMBODIMENT

Steering System

Figure 1:
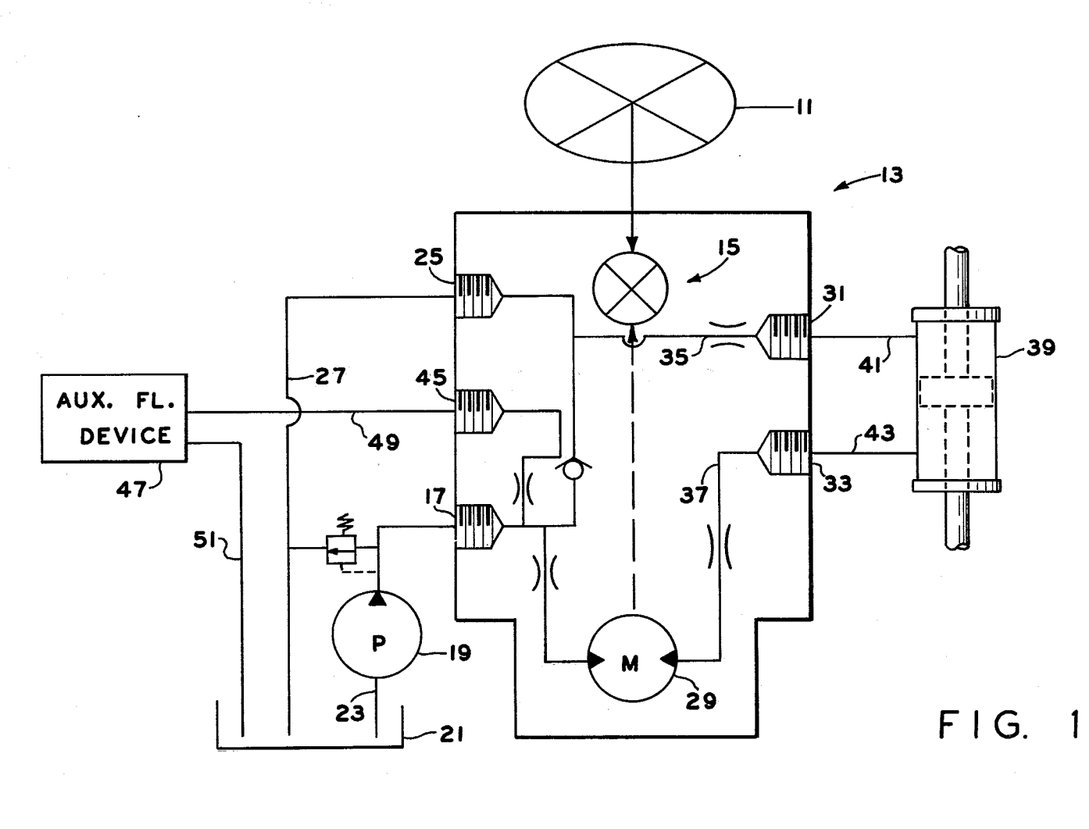
FIG. 1 is a diagrammatic view of a vehicle power steering system and controller to which the present invention may be applied.

Referring now to the drawings which are for the purpose of illustrating a preferred embodiment of the invention, and not for limiting the same, FIG. 1 illustrates diagrammatically a vehicle power steering system of the type to which the present invention is applicable. Such systems have become well known in the art and comprise, in general, a steering wheel 11 operably connected to a controller 13 and, more specifically, to the valve means 15. The controller 13 is provided with an inlet port 17 through which the controller 13 receives the full system fluid flow from a source, such as a pump 19, which is connected to a reservoir or tank 21 by a conduit 23. The controller 13 is also provided with an outlet port 25 connected to the reservoir 21 by a conduit 27. Associated with the controller is a fluid meter 29 operably connected to the valve means 15 to meter or measure fluid flow in response to rotational movement of the steering wheel 11 and valve means 15. The controller includes a left turn port 31 and a right turn port 33, the left turn port 31 being fed by a flow path 35 and the right turn port 33 being fed by a flow path 37, the diagram of FIG. 1 illustrating the system in a right turn condition, and the flow path 37 being shown connected to the fluid meter 29. A power steering cylinder 39 is operated by the controller 13 by means of a conduit 41 connected to the left turn port 31, and a conduit 43 connected to the right turn port 33. The controller 13 optionally includes an auxiliary fluid port 45, from which fluid is communicated to an auxiliary device 47 by means of a conduit 49. The auxiliary device 47 is also connected to the reservoir 21 by a conduit 51.

Controller

Figure 2:
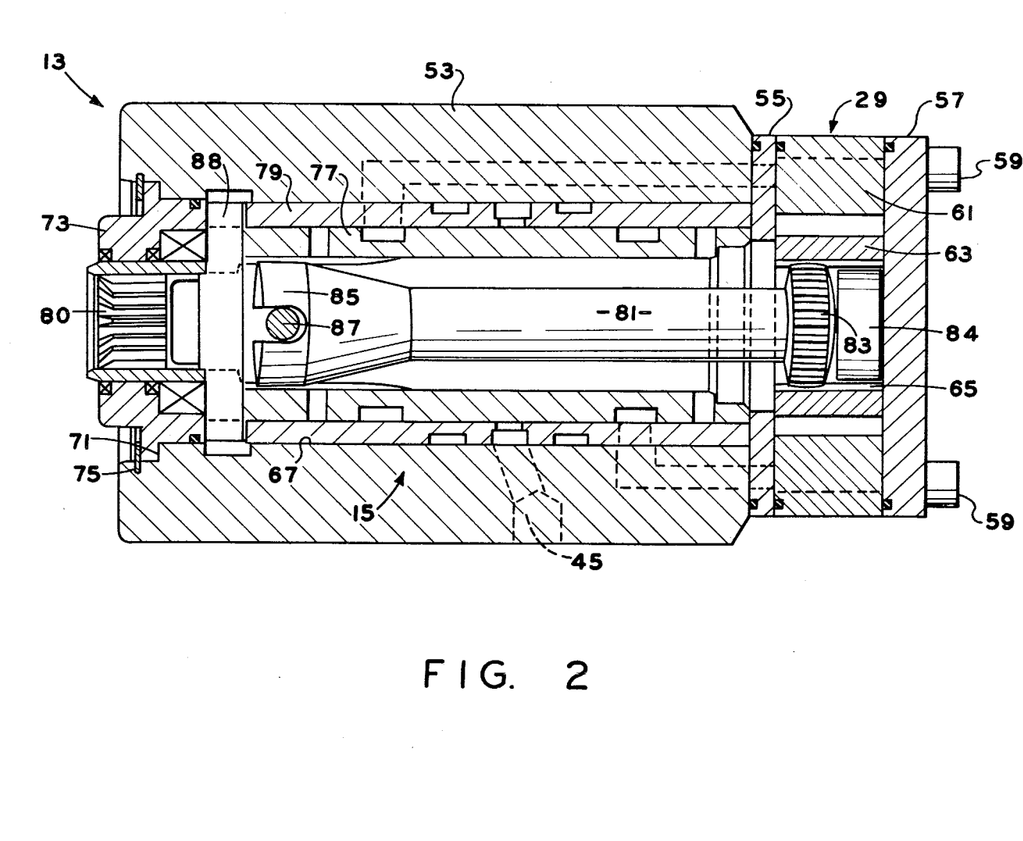
FIG. 2 is an enlarged view, in axial cross section, of the controller shown diagrammatically in FIG. 1.

FIG. 2 is an axial cross section of the controller 13 taken on a plane such that none of the ports 17, 25, 31 or 33 is visible. The controller 13 includes a housing 53, a plate 55, the fluid meter 29 and an end plate 57. These sections are fastened in tight engagement by a plurality of bolts 59 passing into tapped holes (not shown) in the housing 53.

The fluid meter 29 includes an internally toothed member 61 held in a fixed relationship with respect to the plate 55 and end plate 57 by the bolts 59. Eccentrically disposed within the internally toothed member 61 is an externally toothed member 63 having a splined central opening 65. The controller housing 53 defines a substantially cylindrical, axially extending opening 67 within which is rotatably disposed the valve means 15. At the forward end of housing 53 is a recess 71 against which is seated an end cap 73, retained in place by a retaining ring 75.

The valve means 15 comprises a primary, rotatable valve member (spool) 77, and a cooperating, relatively rotatable follow-up valve member (sleeve) 79. The spool 77 terminates at its forward end in an internal spline portion 80 for connection to an externally splined shaft (not shown) attached to steering wheel 11. The sleeve 79 is coupled to the spool 77 by means of a drive shaft 81 having, at its rearward end, a crowned splined head 83 in engagement with the splined central opening 65 of the externally toothed member 63 with the drive shaft 81 being restrained from axial movement, in part, by a spacer 84 between splined head 83 and end plate 57. At the opposite end of the drive shaft 81 is a bifurcated and portion 85 through which passes a transverse drive pin 87. The transverse drive pin 87 passes through an opening in the spool 77 and engages the sleeve 79 in a manner well known in the art, and which forms no part of the present invention. Disposed approximately at right angles to the pin 87 is a plurality of leaf springs 88 urging spool 77 and sleeve 79 toward the neutral position relative to each other. Certain other details of the construction and operation of such controllers which also form no part of the present invention may be better understood by reference to the previously cited U.S. Pat. No. Re. 25,126, assigned to the assignee of the present invention.

Figure 5:
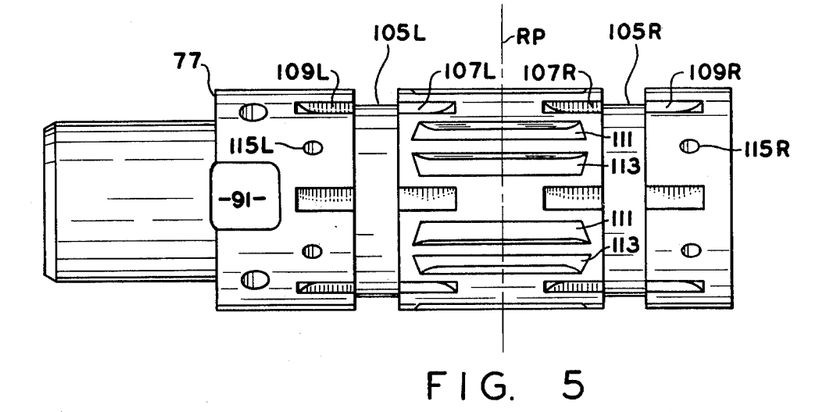
FIG. 5 is a side elevation of the valve spool used in the controller.
Figure 6:
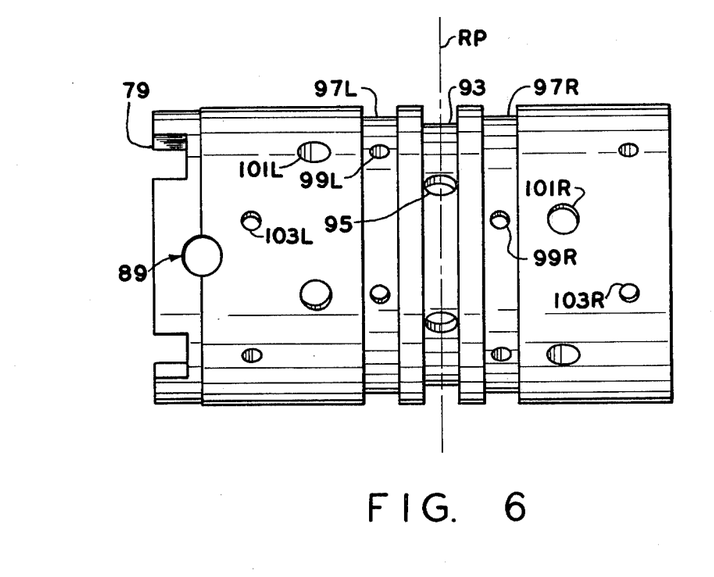
FIG. 6 is a side elevation of the valve sleeve used in the controller.

FIGS. 5 and 6 are side elevations of the valve spool and valve sleeve, respectively, on approximately the same scale as FIG. 2. In both FIGS. 5 and 6, there is shown a reference plane RP oriented perpendicular to the axes of rotation of spool 77 and sleeve 79, the plane RP being included to facilitate an understanding of the present invention.

The valve sleeve 79 includes a pair of diametrically opposed pin slots 89 (only one of which is shown in FIG. 6), adapted to engage the transverse drive pin 87. Similarly, the valve spool 77 includes a pair of diametrically-opposed pin slots 91 (only one of which is shown in FIG. 5), to permit the drive pin 87 to pass therethrough without engaging the spool 77, except at maximum deflection.

In connection with the subsequent description of the spool and sleeve in FIGS. 5 and 6, as well as the operational description of FIGS. 3, 3A, 4 and 4A, it should be noted that many of the apertures, orifices, passages, etc. are arranged in a mirror image with respect with the reference plane RP. Thus, such elements will be described by a reference numeral followed by either an R or L to indicate that the element is located on the right side or the left side, respectively, of the central reference plane RP. On the other hand, certain of the elements do not have a corresponding element oppositely disposed about the reference plane RP and will be referred to by use by a reference numeral alone.

Formed in the outer surface of the valve sleeve 79 is a centrally disposed circumferential groove 93 into which a plurality of orifices 95 open. Oppositely disposed about the plane RP are circumferential grooves 97L and 97R which communicate, respectively, with pluralities of pressure ports 99L and 99R. Disposed further from the reference plane RP are pluralities of meter ports 101L and 101R. Finally, valve sleeve 79 includes pluralities of operating ports 103L and 103R. It should be noted that in the subject embodiment, for each of the pluralities of ports, the circumferential spacing from one port to the next is substantially the same, and furthermore, although not all of the ports of each type are shown, there are six of each in the subject embodiment, although the number may vary.

The valve spool 77 has formed within its outer surface a pair of circumferential meter grooves 105L and 105R equally and oppositely disposed about reference plane RP. It should be noted that when the valve sleeve 79 is disposed about the valve spool member 77, the members 77 and 79 will be in the same axial relationship as is shown in FIGS. 5 and 6, with the reference planes RP coincidental. Thus, the meter grooves 105L and 105R are axially aligned with, and in fluid communication with meter ports 101L and 101R, respectively. Extending axially inwardly (toward reference plane RP) from the meter grooves 105L and 105R are pluralities of circumferentially spaced apart passages 107L and 107R, which are adapted to communicate with the pressure ports 99L and 99R when the spool 77 and sleeve 79 are in the proper relative rotational position, as will be described more fully in connection with FIGS. 3 and 4. Extending axially outwardly from the meter grooves 105L and 105R are pluralities of operating passages 109L and 109R, each of which, in the subject embodiment is axially aligned with one of the passages 107L or 107R. The operating passages 109L and 109R are adapted to communicate with the operating ports 103L and 103R, respectively, in response to a certain rotational relationship between the spool 77 and sleeve 79. As was noted in connection with sleeve 79, the individual passages comprising each of the above-described pluralities of passages preferably have uniform circumferential spacing therebetween, the circumferential spacing between the passages preferably being the same as that between the ports of the valve sleeve 79. Axially disposed between the meter grooves 105L and 105R and circumferentially disposed between adjacent passages 107L and 107R are a plurality of pairs of passages 111 and 113, the passage 111 being disposed to communicate between pressure port 99L and auxiliary port 95, while the passage 113 is adapted to communicate between the pressure port 99R and the auxiliary port 95 when the spool 77 and sleeve 79 are in the neutral position with respect to each other, as is illustrated and explained in greater detail in U.S. patent application Ser. No. 507,041, filed Sept. 18, 1974 by D. Morgan, now U.S. Pat. No. 3,960,234, entitled "Controller for Fluid Pressure Operated Devices Providing High Pressure to an Auxiliary Device", and assigned to the assignee of the present invention. In addition to the above-described passages formed in the outer surface of valve spool member 77, there is a plurality of tank ports 115L, circumferentially disposed between operating passages 109L and, oppositely disposed therefrom about reference plane RP, a plurality of tank ports 115R, circumferentially disposed between operating passages 109R. Each of the tank ports 115L and 115R is disposed to be aligned with, and in fluid communication with one of the operating ports 103L and 103R, respectively.

Figure 3:
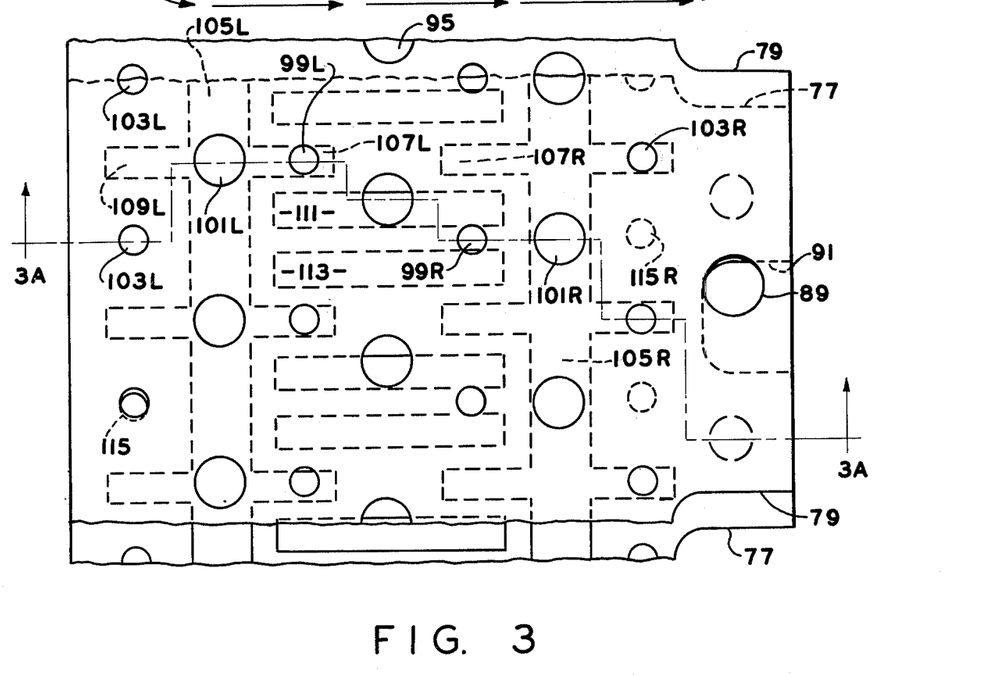
FIGS. 3 and 4 are fragmentary, overlaying views of the valve members of the present invention, illustrating right and left turn conditions, respectively.
Figure 3A:
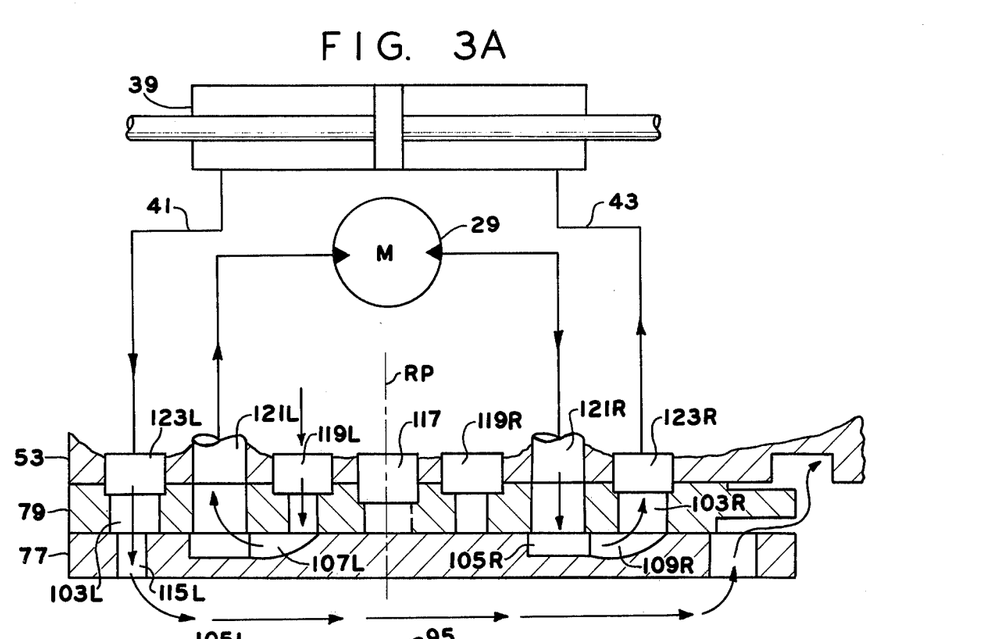
FIGS. 3A and 4A are semi-schematic cross sections taken on lines 3A—3A and 4A—4A of FIGS. 3 and 4, respectively.
Figure 4:
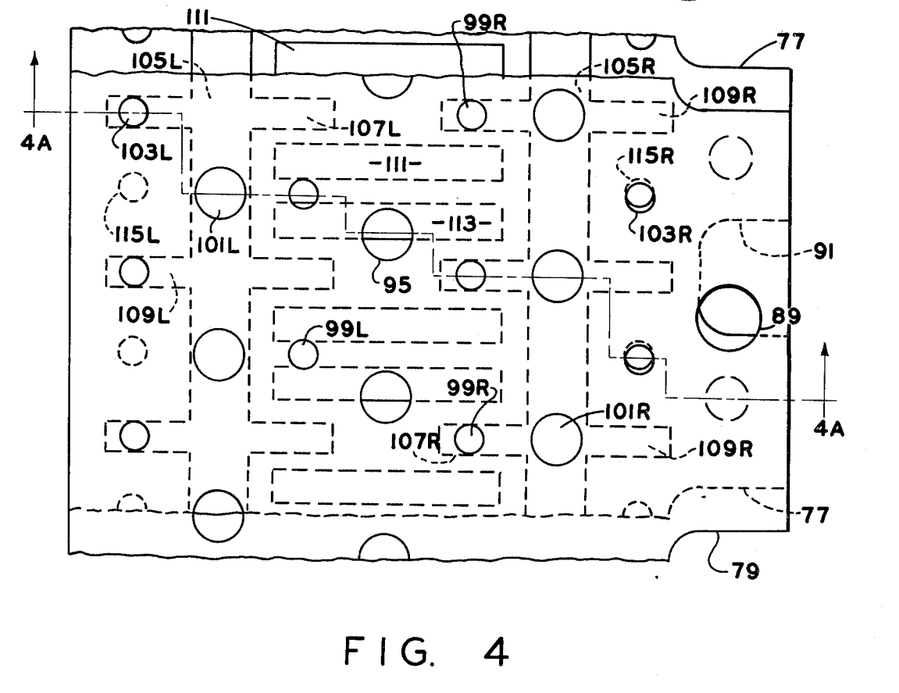
Figure 4A:
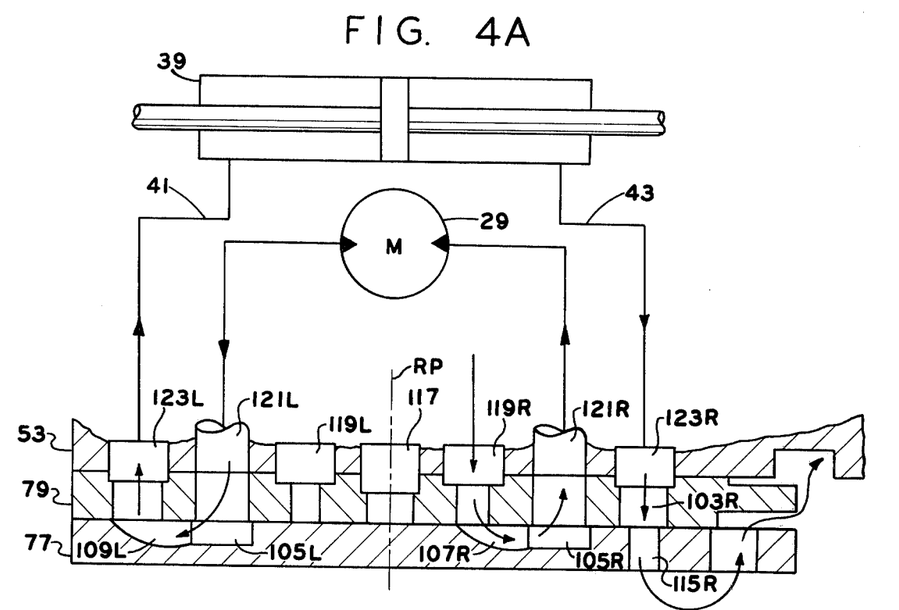

FIGS. 3 and 4, and the semi-schematic cross sections shown in FIGS. 3A and 4A, illustrate right and left turn conditions, respectively, of the controller 13 and valve means 15. In the fragmentary, overlaying views of FIGS. 3 and 4, about 180° of both the valve spool 77 and valve sleeve 79 are shown, with the members 77 and 79 being displaced about 10° with respect to each other from the neutral position, as occurs during steering of the vehicle. Generally, solid lines indicate ports defined by the valve sleeve 79 whereas the dashed lines indicate ports or passages formed in the valve spool 77, and covered by the valve sleeve 79. As is shown schematically in FIGS. 3A and 4A, the controller housing 53 defines a plurality of passages communicating between the valve means 15 and the various ports, such as inlet port 17, cylinder ports 31 and 33, etc. Among the passages defined by the housing 53 is an auxiliary passage 117 and a pair of source passages 119L and 119R. Also defined by the housing 53 are oppositely disposed meter passages 121L and 121R, and operating passages 123L and 123R. It is a feature of the present invention that not only are the ports and passages defined by the spool 77 and sleeve 79 symmetrical about the reference plane RP, but also, the communicating passages defined by the housing 53 may also be symmetrical, either with respect to the reference plane RP or the axes of rotation of the valve means 15, but at the very least, such passages should be arranged such that the total flow path for either direction of operation (i.e., either a left turn or a right turn) is substantially the same length and flow resistance. Thus, the pressure drop along the flow path in either direction will also be the same. It should also be noted in connection with FIGS. 3 and 4 that for purposes of clarity, circumferential grooves 93, 97L and 97R are not shown. It will be understood however that because of grooves 97L and 97R, pressure ports 99L and 99R are always in fluid communication with passages 119L and 119R, respectively, regardless of the relative rotational position of valve spool 77 and sleeve 79.

Operation

In the right turn condition illustrated in FIG. 3, fluid introduced at inlet port 17 flows through passage 119L, around circumferential groove 97L and into pressure ports 99L. With the spool 77 and sleeve 79 in the relative positions shown in FIG. 3, the pressure ports 99L are each aligned with one of the passages 107L, thus permitting fluid to pass therethrough, then into meter groove 105L, through meter ports 101L, then to the fluid meter 29 through passage 121L. After the fluid is metered or measured by the fluid meter 29 it passes through passage 121R, through meter ports 101R and into meter groove 105R. From groove 105R the fluid then enters operating passages 109R which are now circumferentially aligned with operating ports 103R, permitting the fluid to pass therethrough, then through passage 123R to the right turn port 33 (see FIG. 1), from where the fluid passes through conduit 43 to the power steering cylinder 39. The fluid introduced into cylinder 39 moves the piston to the left, thus displacing fluid on the left side of the piston forcing it to return to the controller through conduit 41 where it enters the controller at the left turn port 31 and passes toward the valve means 15 through passage 123L. From there the returning (return) fluid passes through the operating ports 103L, then through the tank ports 115L which are circumferentially aligned therewith, then through the interior of the valve spool 77, and finally to the outlet port 25.

In the left turn condition shown in FIG. 4, the valve spool 77 and valve sleeve 79 have been rotated in the opposite direction with respect to each other, thus permitting a flow path which is generally the opposite of that for a right turn, and substantially the same path length. Fluid from inlet port 17 flows through passage 119R, circumferential groove 97R, through the plurality of the pressure ports 99R then through the circumferentially aligned passages 107R to the meter groove 105R. From there the flow is through the meter ports 101R, passage 121R to the fluid meter 29, then to passage 121L, in through meter port 101L to meter groove 105L, then axially into operating passages 109L. From the passages 109L fluid flows out through circumferentially aligned operating ports 103L, through passage 123L to the left turn port 31, then through conduit 41 to the power steering cylinder 39. Fluid displaced at the opposite end of cylinder 39 returns by means of conduit 43 to the right turn port 33, then through passage 123R to the valve means 15, then through operating ports 103R, and through tank ports 115R to the interior of valve spool 77, and then to the outlet port 25.

It should be noted in connection with both directions of operation (i.e., both right turn and left turn conditions), that not only are the flow paths symmetrical and therefore, "balanced" with regard to the path length, but also, the metered and return fluids are maintained axially separated. In FIGS. 3 and 3A, it can be seen that circumferential groove 105R and passages 107R and 109R contain metered fluid while return fluid passes through operating ports 103L and tank ports 115L at the opposite end of the spool-sleeve valve. Generally disposed therebetween are passages 109L, 107L, 111 and 113, groove 105L and ports 101L, 99L, 95 and 99R all of which contain high pressure, non-metered fluid serving as a buffer between the metered and return fluids to minimize the tendency for leakage to occur therebetween. A similar, but opposite arrangement of metered, return and high pressure non-metered fluids can be seen in FIGS. 4 and 4A.

While the invention has been described with reference to a preferred embodiment, neither the illustrated embodiment nor the terminology employed in describing it is intended to be limiting; rather, it is intended to be limited only by the scope of the appended claims.

I claim:

1. A controller for fluid pressure operated devices, said controller comprising:
   a. a housing;
   b. valve means disposed in said housing including a primary, rotatable valve member and a cooperating, relatively rotatable follow-up valve member, said valve members defining a neutral position relative to each other and having generally coincidental axes of rotation;
   c. means coupling said follow-up valve member to said primary valve member for limited movement relative to said neutral position and for common rotary movement therewith;
   d. a fluid meter including a metering member movable to measure the volume of fluid which passes therethrough;

e. means coupling said metering member to said follow-up valve member for imparting follow-up movement thereto responsive to movement of said metering member;

f. said controller including an inlet port, an outlet port, and first and second control fluid ports for connection to a fluid pressure operated device, said primary and follow-up valve members cooperating with said housing to define a first plurality of fluid passages therein which connect said inlet port in fluid communication with said first control fluid port through said fluid meter when said valve members are relatively displaced in one direction from the neutral position and a second plurality of fluid passages which connect said inlet port in fluid communication with said second control fluid port through said meter when said valve members are relatively displaced in the other direction from the neutral position;

g. said first and second pluralities of fluid passages being constructed and arranged to provide substantially the same restriction to fluid flow between said inlet port and said first and second control fluid ports through said meter in either direction of displacement of said valve members from said neutral position to provide a controller having uniform response in either direction of relative displacement of said valve members from said neutral position; and h. said first and second pluralities of fluid passages being oppositely disposed about an imaginary plane perpendicular to the axes of rotation of said valve members.

2. A controller as defined in claim 1 wherein certain of said first plurality of fluid passages are operable to connect said second control fluid port in fluid communication with said outlet port when said valve members are relatively displaced in said one direction from said neutral position and wherein certain of said second plurality of fluid passages are operable to connect said first control fluid port in fluid communication with said outlet port when said valve members are relatively displaced in said other direction from said neutral position.

3. A controller as defined in claim 2 wherein said first and second pluralities of fluid passages defined by said housing and said valve members for connecting said inlet to said first and second control fluid ports through said fluid meter are arranged in substantially a mirror image of each other with respect to an imaginary plane perpendicular to the axes of rotation of said valve members.

4. A controller as defined in claim 3 wherein said first and second pluralities of fluid passages contain metered fluid and return fluid, said metered fluid and said return fluid being oppositely disposed about said imaginary plane.

5. A controller as defined in claim 4 wherein said first and second pluralities of fluid passages contain high pressure, non-metered fluid, disposed generally between said metered fluid and said return fluid.

6. A controller for fluid pressure operated devices, said controller including a housing having an inlet and an outlet, and first and second control fluid ports adapted for connection to a fluid pressure operated device, said controller comprising:

a. valve means including a primary, rotatable valve member and a cooperating, relatively rotatable follow-up valve member, said valve members defining a neutral position relative to each other and having generally coincidental axes of rotation;

b. means coupling said follow-up valve member to said primary valve member for limited movement independently thereof and for common movement therewith;

c. a fluid meter including a movable member and means coupling said movable member to said follow-up valve member for imparting follow-up movement thereto responsive to movement of said primary valve member;

d. said controller having source passage means communicable with said inlet, first and second control fluid passages for connection to said first and second control fluid ports, and first and second fluid meter passages for connection to said fluid meter;

e. said follow-up valve member defining a reference plane oriented generally perpendicular to said axes of rotation, said follow-up valve member further defining:

i. first and second pressure ports in substantially continuous, open communication with said source passage means, said first and second pressure ports being oppositely and approximately equally disposed about said reference plane, ii. first and second meter ports operable to communicate with said first and second fluid meter passages, respectively, said first and second meter ports being oppositely and approximately equally disposed about said reference plane, and iii. first and second operating ports in substantially continuous, open communication with said first and second control fluid passages, respectively, said first and second operating ports being oppositely and approximately equally disposed about said reference plane;

f. said primary valve member defining a first fluid passage operable to provide fluid communication between said first pressure port and said first meter port in response to relative displacement of said valve members in one direction from said neutral position and a second fluid passage operable to provide fluid communication between said second pressure port and said second meter port in response to relative displacement of said valve members in the other direction from said neutral position; and g. said primary valve member defining a first operating passage operable to provide fluid communication between said first meter port and said first operating port in response to relative displacement of said valve members in said other direction from said neutral position and a second operating passage operable to provide fluid communication between said second meter port and said second operating port in response to relative displacement of said valve members in said one direction from said neutral position.

7. A controller as defined in claim 6 wherein said primary valve member defines first and second circumferential meter grooves, said first and second meter grooves being oppositely and approximately equally disposed about said reference plane.

8. A controller as defined in claim 7 wherein said first fluid passage includes said first meter groove and said second fluid passage includes said second meter groove.

9. A controller as defined in claim 8 wherein said first fluid passage includes a first axial fluid slot communicating with said first meter groove, said first axial fluid slot being disposed to communicate with said first pressure port in response to relative displacement of said valve members in said one direction from said neutral position, and said second fluid passage includes a second axial fluid slot communicating with said second meter groove, said axial fluid slot being disposed to communicate with said second pressure port in response to relative displacement of said valve members in said other direction from said neutral position.

10. A controller as defined in claim 7 wherein said first operating passage includes said first meter groove and said second operating passage includes said second meter groove.

11. A controller as defined in claim 10 wherein said first operating passage includes a first axial operating slot communicating with said first meter groove, said first axial operating slot being disposed to communicate with said first operating port in response to relative displacement of said valve members in said other direction from said neutral position, and said second operating passage including a second axial operating slot communicating with said second meter groove, said second axial operating slot being disposed to communicate with said second operating port in response to relative displacement of said valve members in said one direction from said neutral position.

12. A controller for fluid pressure operated devices, said controller comprising:
 a. a housing;
 b. valve means disposed in said housing including a primary, rotatable valve member and a cooperating, relatively rotatable follow-up valve member, said valve members defining a neutral position relative to each other and having generally coincidental axes of rotation;
 c. means coupling said follow-up valve member to said primary valve member for limited movement relative to said neutral position and for common rotary movement therewith;
 d. a fluid meter including a metering member movable to measure the volume of fluid which passes therethrough;
 e. means coupling said metering member to said follow-up valve member for imparting follow-up movement thereto responsive to movement of said metering member;
 f. said controller including an inlet port, an outlet port, and first and second control fluid ports for connection to a fluid pressure operated device, said primary and follow-up valve members cooperating with said housing to define a first plurality of fluid passages connecting said inlet port in fluid communication with said first control fluid port through said fluid meter when said valve members are relatively displaced in one direction from the neutral position, and a second plurality of fluid passages connecting said inlet port in fluid communication with said second control fluid port through said fluid meter when said valve members are relatively displaced in the other direction from the neutral position;
 g. said first and second pluralities of fluid passages being oppositely and approximately equally disposed about a reference plane perpendicular to the axes of rotation of said valve members to provide a controller having uniform response in either direction of relative displacement of said valve members.

13. A controller as defined in claim 12 wherein certain of said first plurality of fluid passages are operable to connect said second control fluid port in fluid communication with said outlet port when said valve members are relatively displaced in said one direction from said neutral position and wherein certain of said second plurality of fluid passages are operable to connect said first control fluid port in fluid communication with said outlet port when said valve members are relatively displaced in said other direction from said neutral position.

14. A controller as defined in claim 12 wherein high pressure, metered fluid is contained on one side of said reference plane when said valve members are relatively displaced in said one direction from said neutral position, and high pressure, metered fluid is contained on the other side of said reference plane when said valve members are relatively displaced in said other direction from said neutral position.

15. A controller for fluid pressure operated devices, said controller comprising:
 a. a housing;
 b. valve means disposed in said housing including a primary, rotatable valve member and a cooperating, relatively rotatable follow-up valve member, said valve members defining a neutral position relative to each other and having generally coincidental axes of rotation;
 c. means coupling said follow-up valve member to said primary valve member for limited movement relative to said neutral position and for common rotary movement therewith;
 d. a fluid meter including a metering member movable to measure the volume of fluid which passes therethrough;
 e. means coupling said metering member to said follow-up valve member for imparting follow-up movement thereto responsive to movement of said metering member;
 f. said controller including an inlet port, an outlet port, and first and second control fluid ports for connection to a fluid pressure operated device, said primary and follow-up valve members cooperating with said housing to define first and second source passage means in fluid communication with said inlet port and being oppositely and approximately equally disposed about a reference plane disposed generally perpendicular to said axes of rotation;
 g. said primary and follow-up valve members defining a first plurality of fluid passages connecting said first source passage means in fluid communication with said first control fluid port through said fluid meter when said valve members are relatively displaced in one direction from the neutral position, and a second plurality of fluid passages connecting said second source passage means in fluid communication with said second control fluid port through said fluid meter when said valve members are relatively displaced in the other direction from the neutral position; and
 h. said first and second pluralities of fluid passages being constructed and arranged to provide substantially the same restriction to fluid flow between said first and second source passage means and said first and second control fluid ports, respectively, in either direction of displacement of said valve members from said neutral position.

16. A controller for fluid pressure operated devices, said controller comprising:
a. a housing;
b. valve means disposed in said housing including a primary, rotatable valve member and a cooperating, relatively rotatable follow-up valve member, said valve members defining a neutral position relative to each other and having generally coincidental axes of rotation;
c. means coupling said follow-up valve member to said primary valve member for limited movement relative to said neutral position and for common rotary movement therewith;
d. a fluid meter including a metering member movable to measure the volume of fluid which passes therethrough;
e. means coupling said metering member to said follow-up valve member for imparting follow-up movement thereto responsive to movement of said metering member;
f. said controller including an inlet port, an outlet port, and first and second control fluid ports for connection to a fluid pressure operated device, said primary and follow-up valve members cooperating with said housing to define a first fluid passage therein connecting said inlet port in fluid communication with said first control fluid port through said fluid meter when said valve members are relatively displaced in one direction from the neutral position, and a second fluid passage connecting said inlet port in fluid communication with said second control fluid port through said fluid meter when said valve members are relatively displaced in the other direction from the neutral position;
g. said first and second fluid passages being constructed and arranged to provide substantially the same restriction to fluid flow between said inlet port and said first and second control fluid ports, respectively, through said meter, in either direction of displacement of said valve members from said neutral position; and
h. said first and second fluid passages being arranged in substantially a mirror image of each other with respect to a central reference plane disposed generally perpendicular to the axes of rotation of said valve members.

17. A controller as defined in claim 16 wherein said first fluid passage is operable to connect said second control fluid port in fluid communication with said outlet port when said valve members are relatively displaced in said one direction from said neutral position and wherein said second fluid passage is operable to connect said first control fluid port in fluid communication with said outlet port when said valve members are relatively displaced in said other direction from said neutral position.

18. A controller as defined in claim 16 wherein high pressure, metered fluid is contained on one side of said central reference plane and non-metered fluid is contained on the other side of said central reference plane when said valve members are relatively displaced on said one direction from said neutral position.

* * * * *

UNITED STATES PATENT AND TRADEMARK OFFICE
CERTIFICATE OF CORRECTION

PATENT NO. : 4,033,377
DATED : July 5, 1977
INVENTOR(S) : Oliver W. Johnson

It is certified that error appears in the above-identified patent and that said Letters Patent are hereby corrected as shown below:

Col. 2, line 18: return should read "return"
line 27: metered should read "metered"
line 28: return should read "return"
line 31: metered (first occurrence) should read "metered"

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*